No. 680,728.  
F. NISHWITZ, Dec'd.  
C. R. B. NISHWITZ, Administratrix.  
HARROW.  
(Application filed Nov. 16, 1900.)  
Patented Aug. 20, 1901.
(No Model.)
3 Sheets—Sheet 1.
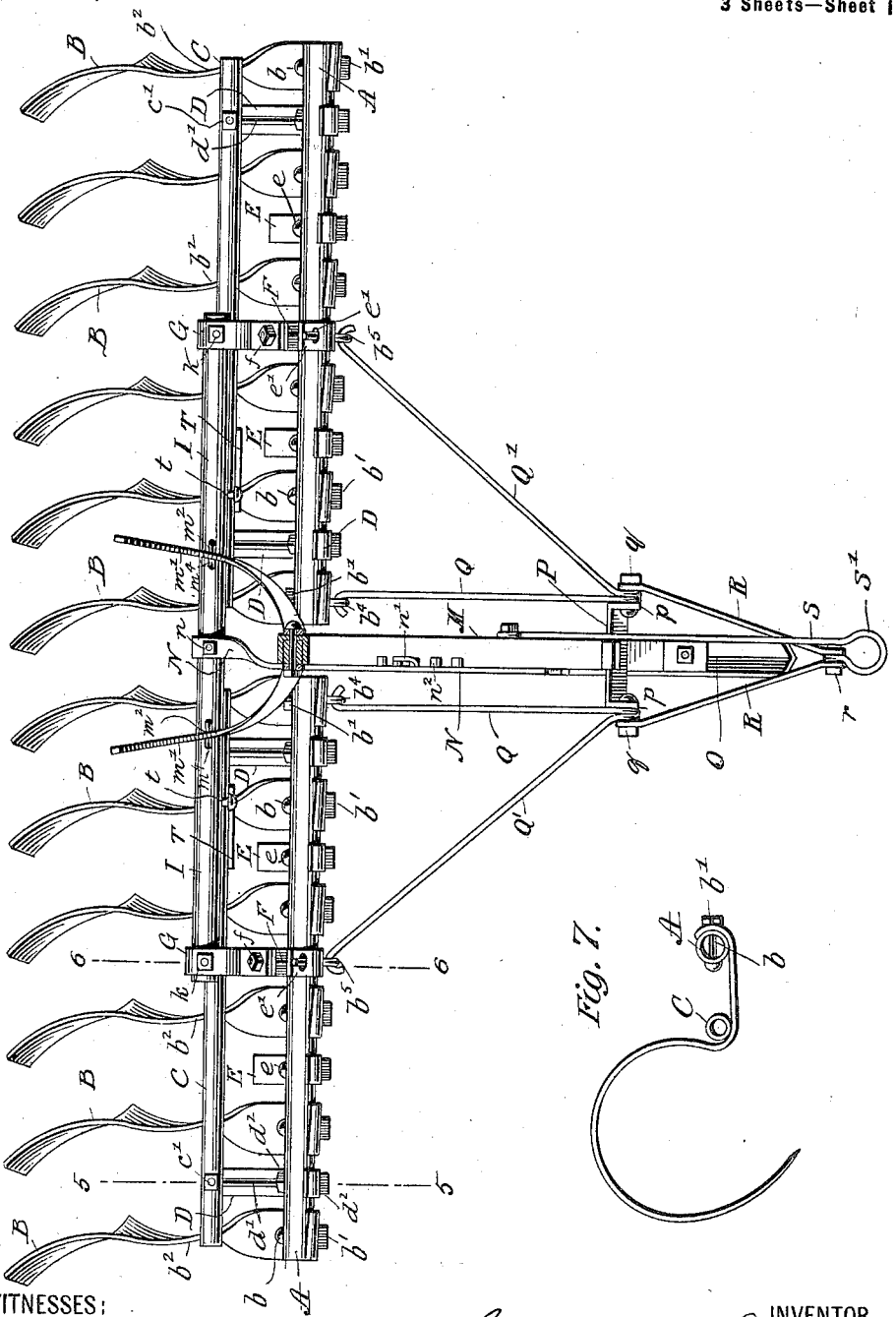
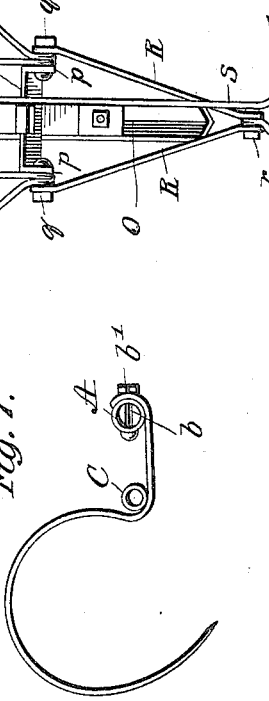

No. 680,728. Patented Aug. 20, 1901.
F. NISHWITZ, Dec'd.
C. R. B. NISHWITZ, Administratrix.
HARROW.
(Application filed Nov. 16, 1900.)
(No Model.) 3 Sheets—Sheet 2.
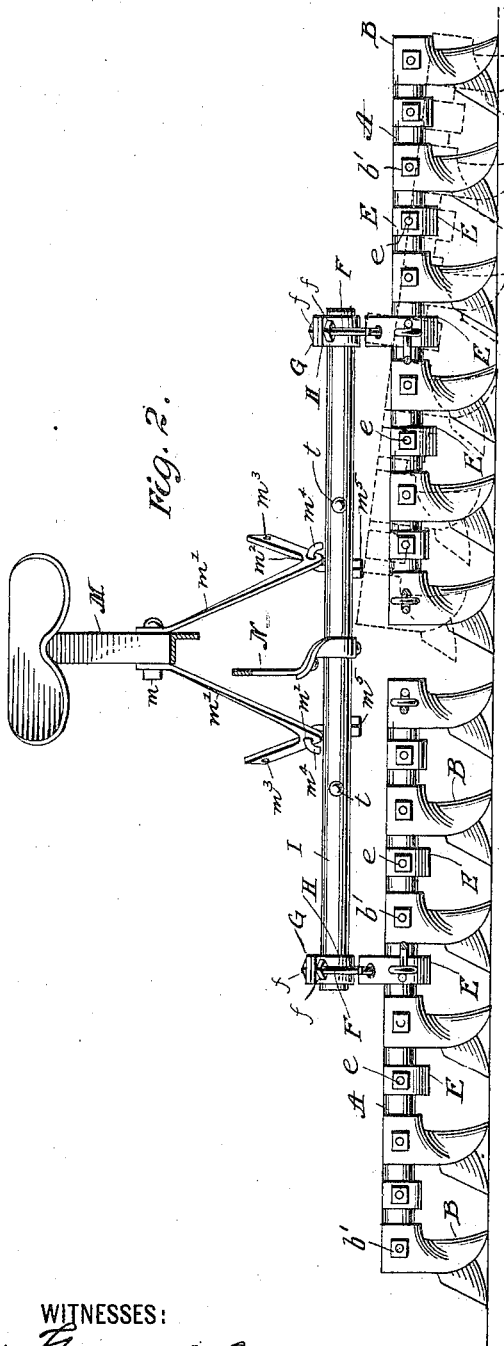
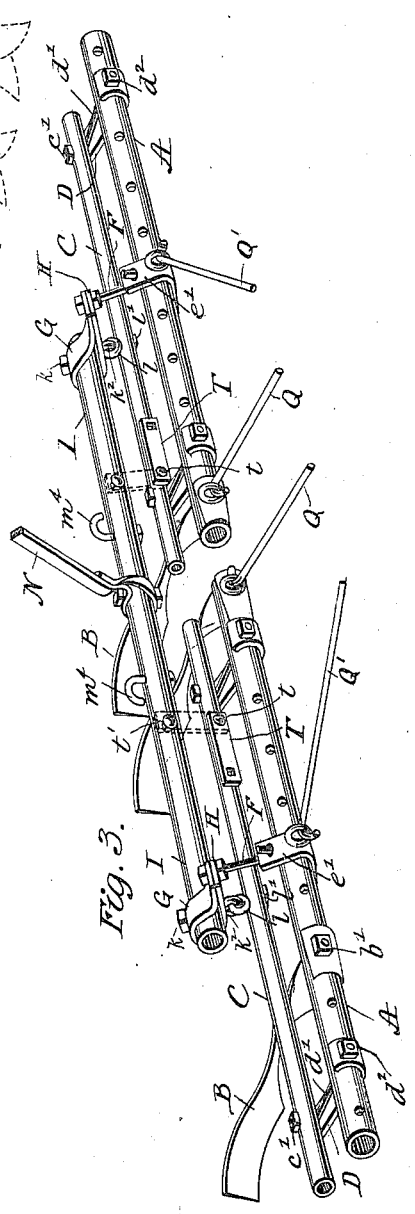
WITNESSES: INVENTOR
ATTORNEYS No. 680,728. Patented Aug. 20, 1901.
F. NISHWITZ, Dec'd.
C. R. B. NISHWITZ, Administratrix.
HARROW.
(Application filed Nov. 16, 1900.)
(No Model.) 3 Sheets—Sheet 3.
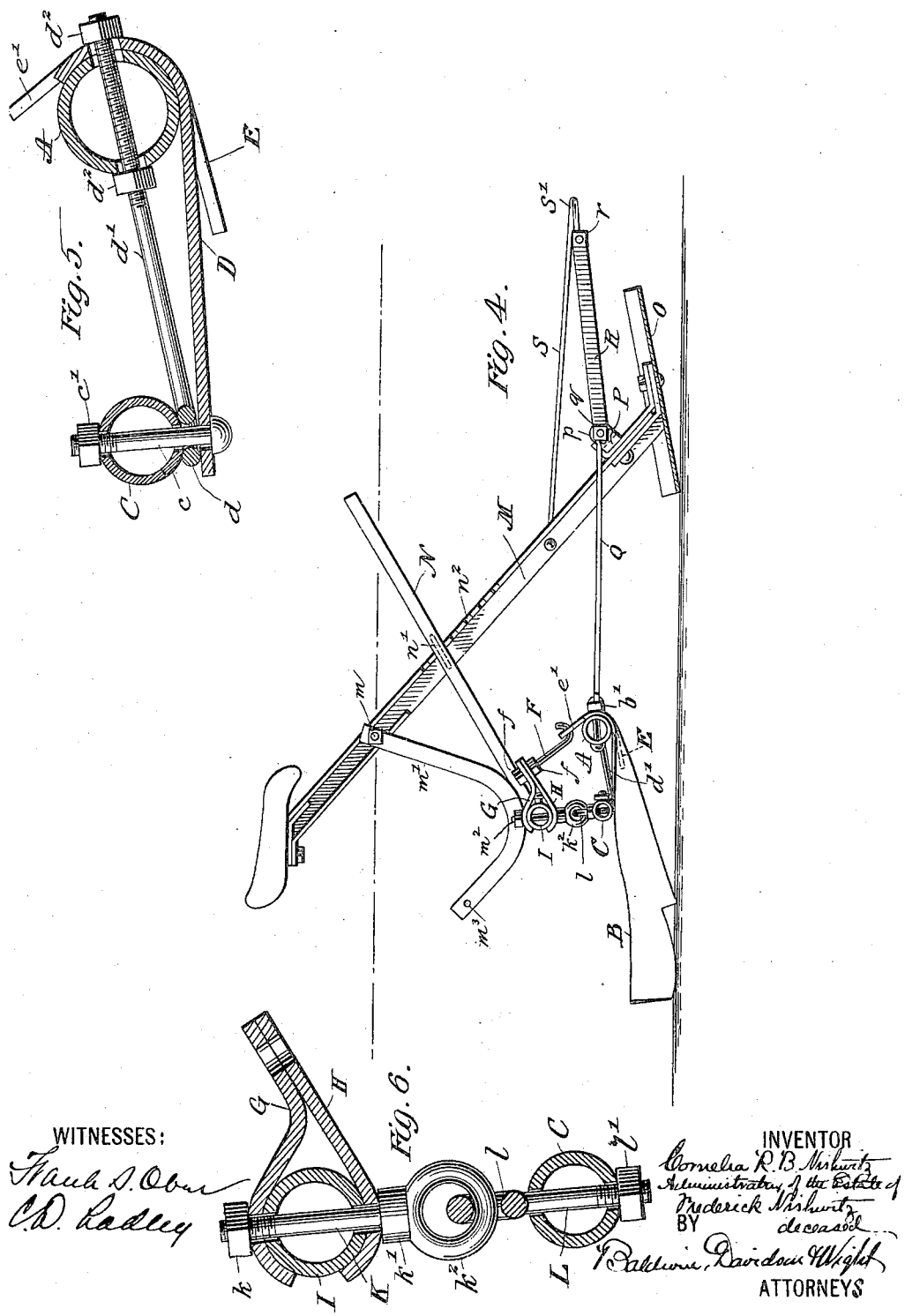

UNITED STATES PATENT OFFICE.

CORNELIA R. B. NISHWITZ, OF MILLINGTON, NEW JERSEY, ADMINISTRATRIX OF FREDERICK NISHWITZ, DECEASED.

HARROW.

SPECIFICATION forming part of Letters Patent No. 680,728, dated August 20, 1901.

Application filed November 16, 1900. Serial No. 36,764. (No model.)

*To all whom it may concern:*

Be it known that FREDERICK NISHWITZ, deceased, late of Millington, in the county of Morris, State of New Jersey, of whose estate I, CORNELIA R. B. NISHWITZ, of Millington aforesaid, am the sole administratrix, was in his lifetime the inventor of certain new and useful Improvements in Harrows, of which the following is a specification.

This invention relates to that general class of machines well known to the trade as "Acme" Harrows and upon which various Letters Patent of the United States have heretofore been issued to the said Frederick Nishwitz, deceased — for instance, No. 262,820, dated August 15, 1882, and No. 527,875, dated October 23, 1894.

The primary object of the invention is to provide a machine in which the transverse gang of cutters or harrow-teeth shall be jointed or flexible, so as to conform to the surface which it traverses, and in which each tooth will be braced against strains and held to its work.

With these general objects in view the machine herein described has been devised.

The subject-matter claimed is hereinafter specifically pointed out.

In the accompanying drawings, Figure 1 is a plan view; Fig. 2, a front elevation with the draft devices removed; Fig. 3, a detached view in perspective showing the gang-bars and related parts. Fig. 4 is a side elevation; Fig. 5, a detailed section on the line 5 5 of Fig. 1, on an enlarged scale, omitting the harrow-teeth; Fig. 6, a similar section on the line 6 6 of Fig. 1 on an enlarged scale; Fig. 7, a detailed view showing a different style of harrow-tooth.

The main gang-bar, which may be of tubular iron, is in the construction here illustrated divided midway of its length and in the center line of the machine—that is, there are two such bars A A, arranged in line. The harrow-teeth B, which are of the same shape and construction as those shown in the prior patent, No. 527,875, above mentioned, are curled or turned at their front flat ends to partially embrace the bar A and are secured by a headed bolt $b$, passing through the bar and tooth and having a nut $b'$ applied to its end.

In the rear of each gang-bar A there is a second bar C, which may be of tubular iron and of substantially the same length as the corresponding gang-bar. It is rigidly connected with the bar A, perferably at two points adjacent, respectively, to the outer tooth and inner tooth of the gang or series of teeth mounted on the bar A, in the following manner and as shown more clearly in Fig. 5. A metal plate D, bent at its front end to embrace the front face of the bar A, extends rearwardly under the bar C and is formed with an aperture, through which passes a headed bolt $c$, also passing through apertures in the bar C and having a nut $c'$ applied to its threaded end. This bolt also passes through an eye $d$, located between the bar C and the upper face of the plate D and forming part of the tie-rod $d'$, whose threaded end passes through apertures in the gang-bar A and through an aperture in the front curved end of the bar D and has nuts $d^2\ d^2$ applied to it, respectively, at its front end and in rear of the bar A. Two such couplings (indicated by the letters D D in Fig. 1) serve to rigidly connect the bars A and C, and the relation of the bar C and the teeth B is such that the bar bears upon the upper edges $b^2$ of the substantially vertical parts of the teeth. The teeth are therefore held down to their work and braced against strains, while at the same time they are held in line and caused to penetrate the soil equally. The remaining spaces between the teeth are occupied by clod-crushing spurs or plates E, whose front ends are curved to embrace the bar A, and are attached thereto by bolts $e$ in substantially the same manner as the teeth are secured and whose opposite flat ends project rearwardly. They are shown as lying in the same plane with the front flat portions of the teeth. Of course they might project rearwardly at an angle different from that of the flat parts of the teeth. When the harrow is rocked or the bars thereof vibrated, as hereinafter described, to throw the teeth upwardly out of working contact with the soil, these plates or spurs E and the flat parts of the teeth support the harrow for transportation. When the harrow is in operation, the spurs E act as clod-crushers. The front end of the centrally-disposed plate or spur E on each gang-bar A is carried upwardly, as indicated at $e'$, Figs. 1 and 4, and is apertured to receive the hooked end of a bolt F, which extends upwardly and rearwardly and whose threaded end extends through the flat contiguous faces of two plates G H, which incline rearwardly and are curved at their ends to embrace the upper and lower faces, respectively, of the tubular iron seat-carrying bar I. Nuts $f$ $f$, applied, respectively, to the rod or bolt F on opposite sides of the plates G H, firmly clamp these plates together and attach the rod to them, Figs. 2, 4, and 6. A bolt K passes upwardly through the plate H, the seat-carrying beam I, and the plate G and has a nut $k$ applied to its upper threaded end, while an enlargement or boss $k'$ on the bolt bears against the under face of the plate H. In this way the plates G H and the seat-carrying beam I are securely clamped together. Integral with the bolt K below the boss $k'$ is an eye $k^2$, interlocking or interconnected with an eye $l$ on a bolt L, passing through the rear or secondary gang-bar C and having a nut $l'$ applied to its lower threaded end. As will be hereinafter more apparent, it is obvious that the bars A C and the associated gang of cutters and clod-crushers on one side of the machine may flex vertically on the hinge connection $k^2$ $l$ to conform to the contour of the surface traversed, as shown by the dotted lines in Fig. 2, and also that the weight of the seat-carrying beam I and superposed parts is transmitted to the beams C C and serves to force the cutters into the soil.

The seat-standard M, which may be of angle-iron, has pivotally connected with it by a bolt $m$ (in a vertical plane somewhat in rear of the vertical plane of the front face of the gang-bar A or in other suitable relation to the gang-bar) two outwardly-curved rocker-shaped arms or legs $m'$, apertured at $m^2$ $m^3$ to receive the hooked ends of bolts $m^4$, passing through the bar I and having nuts $m^5$ applied to their lower ends. In Figs. 1, 2, and 4 the hooks are shown as engaging the apertures $m^2$. A lever N, rigidly connected with the bar I by a bolt $n$, extends forward adjacent to the edge of the seat-standard and has a tooth or latch $n'$, adapted to engage in either one of the series of notches $n^2$ formed in the edge of the seat-standard. A shoe O, of angle-iron, is attached to the lower end of the seat-standard below the draft frame or devices and serves to support the front part of the machine in turning and when the draft of the team is slackened. A like shoe, performing a like function, is shown in the prior patent, No. 527,875. Above this shoe a transverse bar P, with upturned or right-angular ends $p$, is bolted to the seat-standard, (the connection of the shoe and of the bar P being appropriately made, as indicated in Figs. 1 and 4, or otherwise.) The ends $p$ of the transverse bar are respectively about in line with the bolts that secure the inner teeth of the two gangs with their bars A. These bolts are somewhat different from those already described in that they have an eye $b^4$ at their outer ends, while the nut $b'$ is applied to their threaded ends in rear of the gang-bar. A draft-link Q, having a hooked end engaging the eye $b^4$, has at its forward end an eye which is attached to the end $p$ of the cross-bar P by a bolt $q$. Another draft-bar Q', having an eye held by the same bolt $q$, extends rearwardly and outwardly, and a hook upon its rear end engages an eye $b^5$ in the outer end of the bolt that secures to the bar A the central spur or clod-crusher E, having the upwardly-extending end $e'$, with which the hooked bolt F engages. The same bolts $q$ $q$ also pass through and secure eyes in the ends of two draft-links R R, extending forward and connected at their forward convergent ends by a bolt $r$, which passes through them and also through an eye in the forward end of another draft-link S, which is bent to form a loop S' for the attachment of the whiffletree-hook or other draft device, and then extends rearwardly to the seat-standard M, to which it is attached by a bolt $s$.

A machine organized as above set forth possesses a desired flexibility. The cutters are braced and held to their work by the weight of the driver. By the manipulation of the lever N the bar I may be rocked and the inclination of the teeth, and consequently their depth of cut, may be regulated. In the transverse rocking or flexing of the gangs of cutters they turn upon the eye connection $k^2$ $l$ and also upon the connection of the bolt or hooked rod F with the end $e'$ of the central spur or clod-crusher E, these two points of pivotal connection being in the same line. The adjustments of the machine are accomplished by the rocking of the seat-carrying bar I by means of the hand-lever N. The hinge connection between the seat-bars $m'$ and the beam I and the hinge connection between these arms and the seat-standard and the flexing of the draft-rods permit the various readjustments of relationship when the harrow is set in different operative positions by the manipulation of the lever N.

Under some conditions it may be desirable to hold the gangs of cutters rigidly, and to this end there are provided, Figs. 1 and 3, braces or straps T, connected with the bars C and capable when desired of being turned upon their bolt connections $t$ with said bars into a vertical position and secured to the bar I by bolts $t'$.

The machine as herein described and illustrated in the accompanying drawings has been marketed to a considerable extent, and the construction is therefore believed to be a practical and efficient one. Changes, however, may be made by those skilled in the art without departing from the principles of the invention and without producing a machine having a different behavior or mode of operation.

In Fig. 7 an arched or spring harrow-tooth has been illustrated, and it is apparent that such teeth may be used in the machine described in lieu of the trailing teeth illustrated in the other figures.

The bars C have the dual function of holding down and bracing the teeth and also serving as the connecting means through which the gangs of teeth are rocked or adjusted. An organization involving the performance of either function would be considered as within the scope of this invention.

What is claimed as new, and desired to be secured by Letters Patent, is—

1. In a harrow, the combination of the gang-bar, rearwardly-projecting teeth secured thereto, a bar arranged in rear of the gang-bar and rigidly connected thereto, a rocking bar arranged above said rear bar, hinge connections respectively between the rocking bar and the gang-bar and said rear bar, and a lever for rocking the rocking bar, to thereby adjust the relation of the parts and change the angular relation of the teeth to the soil.

2. In a harrow, the combination of the gang-bar, rearwardly-projecting teeth attached thereto, a second bar arranged in rear of the gang-bar and rigidly connected therewith, a third and rocking bar flexibly connected respectively with the gang-bar and the rear bar rigidly connected with the gang-bar, a seat-standard supported upon the rocking bar by pivotally-connected supports, and a hand-lever connected with the rocking bar.

3. In a harrow, the combination of two gang-bars arranged in line respectively on opposite sides of the central draft-line of the machine, rearwardly-projecting teeth secured to the gang-bars, a bar in rear of and connected to each gang-bar, a bar arranged in rear of the gang-bars and disposed across the central draft-line, and hinge connections connecting said bar and the respective gang-bars at or about midway of the length of the latter, whereby the gang-bars and the gangs of teeth carried thereby may rock transversely to the line of draft.

4. In a harrow, the combination of two gang-bars arranged in line respectively on opposite sides of the central draft-line of the machine, rearwardly-projecting teeth secured to the gang-bars, a bar in rear of and connected to each gang-bar, a bar arranged in rear of the gang-bars and disposed across the central draft-line, hinge connections connecting said bar and the respective gang-bars at or about midway of the length of the latter, whereby the gang-bars and the gangs of teeth carried thereby may rock transversely, and means for rocking said rear bar to vary the angular relation of the teeth to the soil.

5. In a harrow, the combination of two gang-bars arranged in line on opposite sides of the central draft-line of the machine, rearwardly-projecting teeth secured thereto, a bar arranged over the teeth in rear of each gang-bar and rigidly attached to said gang-bar, a bar arranged above the respective gang-bars and the bars rigidly connected therewith, and hinge connections between said bar and the respective gang-bars and bars rigidly connected thereto.

6. In a harrow the combination of two gang-bars arranged in line on opposite sides of the central draft-line of the machine, a bar arranged in rear of each gang-bar and rigidly connected thereto, a rocking bar arranged across the central draft-line, hinge connections between its opposite ends and the gang-bar and its rigidly-connected bar, and a lever for rocking the rocking bar to change the angular relation of the teeth to the soil.

7. In a harrow, the combination of two gang-bars arranged in line on opposite sides of the central draft-line of the machine, a bar arranged in rear of each gang-bar and rigidly connected thereto, a rocking bar arranged across the central draft-line, hinge connections between its opposite ends and the gang-bar and its rigidly-connected bar, a lever for rocking the rocking bar to change the angular relation of the teeth to the soil, a seat-standard and pivotally-connected supports connecting the seat-standard and the rocking bar.

8. In a harrow the combination of the gang-bars A A arranged in line on opposite sides of the central draft-line of the machine, rearwardly-projecting teeth secured thereto, a bar C lying above the teeth in rear of each gang-bar and rigidly connected to the gang-bar, the rocking bar I, hinge connections between its ends and the bars A C upon which said bars may rock transversely to the line of draft, means for rocking the bar I to vary the angular relation of the teeth to the soil, and means whereby at will the bars A C may be held from rocking transversely on said hinge connections.

9. In a harrow the combination of the gang-bars A, the bars C rigidly connected therewith, the rocking bar I and means for rocking it, hinge connections between the ends of the bar I and the bars A C at or about their middles, an inclined seat-standard supported at or near its rear upper end on the bar I and having draft devices connected with its forward lower end, straight draft-links connecting the inner ends of the two bars A with the draft devices and oblique draft-links connected with the bars A at or about in line with their hinge connections and with the draft devices at their forward ends.

10. In a harrow the combination of a harrow-frame comprising transverse frame-bars C, C, two gang-bars rocking transversely to the line of draft and arranged in line on opposite sides of the central draft-line, an inclined seat-standard having draft devices connected with its forward lower end and supported at its rear upper end upon the harrow-frame, draft-links connecting the inner ends of the gang-bars with said draft devices and obliquely-arranged draft-links extending from said draft devices and connected with the transversely-rocking gang-bars at or about their middle.

11. In a harrow the combination of the gang-bars A, the rearwardly-projecting teeth secured thereto, the intermediate clod-crushers also secured thereto, the bars C arranged in rear of the gang-bars above the teeth and rigidly connected to the gang-bars, the bar I arranged above the bars C, the plates G H embracing the bar I, the eyebolt K passing through said plates and bar, the eyebolts L passing through the bars C, the rod secured to the ends of the projecting plates G H at one end and at its opposite end engaging a plate bolted to the gang-bar A.

In testimony whereof I have hereunto subscribed my name.

CORNELIA R. B. NISHWITZ,
*Administratrix of the estate of Frederick Nishwitz, deceased.*

Witnesses:
DORETTA C. NISHWITZ,
FRED P. BAKER.